United States Patent
Grau (10) Patent No.: US 7,327,362 B2
(45) Date of Patent: Feb. 5, 2008

(54) METHOD AND SYSTEM FOR PROVIDING A VOLUMETRIC REPRESENTATION OF A THREE-DIMENSIONAL OBJECT

(75) Inventor: Oliver Grau, Leatherhead (GB)

(73) Assignee: British Broadcasting Corporation, London (GB)

( * ) Notice: Subject to any disclaimer, the term of this patent is extended or adjusted under 35 U.S.C. 154(b) by 136 days.

(21) Appl. No.: 11/238,119

(22) Filed: Sep. 28, 2005

(65) Prior Publication Data

US 2006/0066614 A1   Mar. 30, 2006

(30) Foreign Application Priority Data

Sep. 28, 2004   (GB)   ................................ 0421547.1

(51) Int. Cl.
    *G06T 17/20*   (2006.01)
(52) U.S. Cl. .................... 345/423; 345/424; 345/427; 382/103
(58) Field of Classification Search ................ 345/419, 345/423, 424, 427; 382/103
    See application file for complete search history.

(56) References Cited

U.S. PATENT DOCUMENTS

| 4,710,876 A | 12/1987 | Cline et al. |
| 4,719,585 A | 1/1988 | Cline et al. |
| 4,885,688 A | 12/1989 | Crawford |
| 7,257,237 B1* | 8/2007 | Luck et al. ............... 382/103 |
| 2002/0158873 A1* | 10/2002 | Williamson ............... 345/427 |

FOREIGN PATENT DOCUMENTS

| GB | 2 321 814 | 8/1988 |
| GB | 2 325 807 | 12/1988 |
| GB | 2 386 489 | 9/2003 |
| GB | 2 393 088 | 3/2004 |
| GB | 2399703 | 9/2004 |
| WO | WO 02/069272 | 9/2002 |
| WO | WO 2004/111799 | 12/2004 |

OTHER PUBLICATIONS

Hilton et al., "Marching Triangles: Range Image Fusion for Complex Object Modelling", IEEE, 1996, International Conference on Image Processing, pp. 381-384.
Magnor et al., "Spacetime-coherent Geometry Reconstruction from Multiple Video Streams", Proceedings of the 2$^{nd}$ International Symposium on 3D Data Processing, Visualization, and Transmission, 3DPVT'04, Greece, 2004, pp. 1-8.
Martin et al., "Volumetric Descriptions of Objects form Multiple Views", IEEE Transactions on Pattern Analysis and Machine Intelligence, vol. PAMI-5, No. 2, Mar. 1983, pp. 150-158.

(Continued)

*Primary Examiner*—Kimbinh T. Nguyen
(74) *Attorney, Agent, or Firm*—Fish & Richardson P.C.

(57) ABSTRACT

A method of providing a volumetric representation of a three dimensional object includes defining a plurality of voxels in a three dimensional space, categorizing voxels as foreground or background according to at least one silhouette image of the object, foreground voxels being assigned a first binary value, and background voxels being assigned a second binary value, and assigning to at least some voxels a value intermediate between the first and second binary values.

22 Claims, 7 Drawing Sheets

OTHER PUBLICATIONS

Niem, Wolfgang, "Robust and Fast Modelling of 3D Natural Objects from Multiple Views", SPIE, vol. 2182, Image and Video Processing II, 1994, pp. 388-397.

Potmesil, Michael, "Generating Octree Models of 3D Objects from Their Silhouetts in a Sequence of Images", Computer Vision, Graphics, and Image Processing, vol. 40, 1987, pp. 1-29.

Sharman, James, "The Marching Cubes Algorithm", http:/www.exafop.org/docs/marchcubes/ind.html, retrieved Nov. 10, 2005, pp. 1-6.

Szeliski, Richard, "Rapid Octree Construction", CVGIP: Image Understanding, vol. 58, No. 1, Jul. 1993, pp. 23-32.

* cited by examiner

METHOD AND SYSTEM FOR PROVIDING A VOLUMETRIC REPRESENTATION OF A THREE-DIMENSIONAL OBJECT

FIELD OF INVENTION

The present invention relates to methods and systems for providing three-dimensional representations and will be described below with reference to this application. However, it will be appreciated that the invention is not limited to this particular field of use.

RELATED APPLICATIONS

Under 35 USC 119, this application claims the benefit of the priority date of U.K. patent application 0421547.1, which was filed on Sep. 28, 2004.

BACKGROUND

Several methods for providing volumetric representations of three-dimensional objects are known in the art. An example of a method for providing volumetric representations of three-dimensional objects includes providing a three-dimensional (3D) shape reconstruction of objects from multiple views. The computation of the visual hull from object silhouettes is a popular technique.

The method, also called shape-from-silhouette, delivers a 3D description of the object. The approach requires a set of silhouette images from calibrated cameras. A silhouette image is a binary (or in some cases, gray scale) image where each pixel indicates whether this pixel belongs to the object or not. The silhouette information can be determined by any suitable segmentation process. This is advantageously done using chroma-keying or difference-keying as described in our GB-0220972.4 and our earlier applications referred therein.

The 3D shape reconstruction can be formulated as the intersection of generalized cones of the silhouette images. A generalized cone is the union of visual rays from all silhouette points of a particular image. This intersection gives only an approximation of the real object shape and is called the visual hull. In particular concavities cannot be modelled with this method.

Several algorithms have been published for the computation of the visual hull, for example: W. Martin and J. K. Aggarwal, "Volumetric descriptions of objects from multiple views," IEEE Transactions on Pattern Analysis and Machine Intelligence, vol. 5, no. 2, pp. 150-158, March 1983; M. Potmesil, "Generating octree models of 3D objects from their silhouettes in a sequence of images," Computer Vision, Graphics and Image Processing, vol. 40, pp. 1-29, 1987; Richard Szeliski, "Rapid octree construction from image sequences," CVGIP: Image Understanding, vol. 58, no. 1, pp. 23-32, July 1993; and Wolfgang Niem, "Robust and fast modelling of 3d natural objects from multiple views," in SPIE Proceedings, Image and Video Processing II, San Jose, February 1994, vol. 2182, pp. 388-397. These approaches attempt to solve the problem in a volumetric space representation. The most common of these representations is to subdivide a 3D box in Euclidian 3D-space into a set of voxels of discrete size. The size of the box is predetermined such that the object can fit inside. In order to save memory these may be represented as "octrees" or are run-length encoded.

For the use of the 3D reconstruction, e.g. in a computer graphic application, a surface description, usually a polygonal mesh has to be generated. An often used algorithm is the marching cubes algorithm, described in U.S. Pat. Nos. 4,710,876, 4,719,585, 4,885,688 and at http://www.exaflop.org/docs/marchcubes/ind.html, the contents of which are all incorporated herein by reference, which creates an iso-surface of a volumetric data set, the iso-surface being made up of contiguous triangles having vertices positioned at mid-points of voxel edges. Since the mentioned shape-from-silhouette methods compute binary voxels the 3D surfaces generated from those using the marching cube algorithm are very noisy. This noise is introduced due to spatial discretization of the volumetric representations. That is to say, real data of the actual shape of the object is lost during the processing of the algorithm.

An improvement over the prior art is described in the applicant's U.K. Patent Publication Number 2 399 703, which discloses combining voxel data with data obtained by projecting line sets into 2 dimensional representations of a 3 dimensional object. The combined data is then used in the above mentioned marching cubes algorithm such that the position of the generated iso-surface triangle vertices is more accurately positioned on respective voxel edges. While this improved method is useful, it tends to use heavily available processing power.

Another problem with volumetric reconstructions from silhouette images is that of redundant voxels which occur due to the approximation errors in the reconstructed 3D volumetric representation when a small number of cameras are used. The reconstruction is always bigger than the actual object. This error is exacerbated when reconstructing volumetric representations of moving objects. When an object moves, the edges formed by two adjacent camera views move relatively over the object, resulting in a reconstruction which is visibly quite disturbing to the viewer.

BRIEF SUMMARY OF THE INVENTION

According to one aspect of the invention, there is provided a method of providing a volumetric representation of a three dimensional object, in which a plurality of voxels are defined in a three dimensional space, and wherein voxels are categorized as foreground or background according to at least one silhouette image of the object, foreground voxels being assigned a first binary value, and background voxels being assigned a second binary value, the method comprising assigning to at least some voxels a value intermediate said first and second binary values.

A further aspect of the invention provides a method of providing a volumetric representation of a three dimensional object, in which a three dimensional space is comprised of a plurality of voxels, and wherein voxels are categorised as foreground or background according to at least one silhouette image of the object, the method comprising subsampling said at least one silhouette image and comparing a projection of at least one voxel with said sub-sampled image to categorize said voxel.

A yet further aspect of the invention provides a method of providing a volumetric representation of a three dimensional object as the intersection of generalized cones of at least one silhouette image of that object, the method comprising selectively removing volume from the representation in dependence on the geometry of the intersections of the generalized cones.

According to a still further aspect of the invention there is provided a method of providing a volumetric representation of a three dimensional object, in which a three dimensional space is comprised of a plurality of voxels, and wherein voxels are categorized as foreground or background according to at least one silhouette image of the object, the method comprising representing the object over a period of time as a 4D model defining a hyper-surface. A smoothing operator can then be applied to said 4D hyper-surface.

As will be appreciated by the person skilled in the art, a voxel is usually defined along orthogonal axes, typically of a cube. However it will be appreciated that for different applications of the invention, the voxels used may be of one or more different shapes, such as rectangular prism, tetrahedron, rhomboid, or of other three-dimensional polyhedra that are able to be part of an array where adjacent shapes share adjoining edges. For the purposes of the specification, unless otherwise defined, the term voxel therefore, is not to be limited to any particular shape.

Preferred embodiments of the invention will now be described, by way of example only and where like reference numerals denote like parts, with reference to the accompanying drawings in which.

BRIEF DESCRIPTION OF THE DRAWINGS

DETAILED DESCRIPTION

Figure 1:
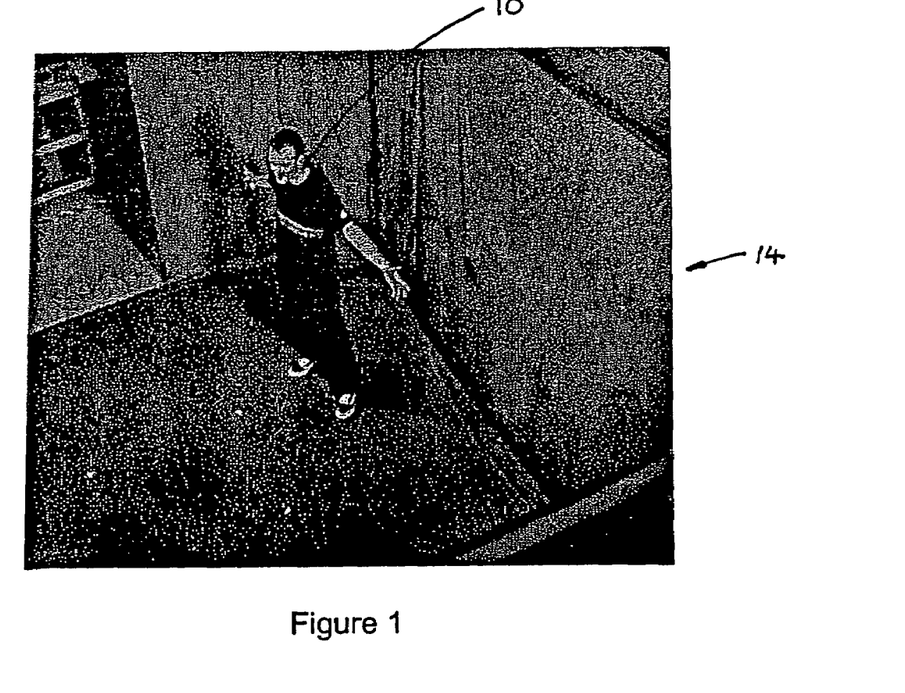
FIG. 1 is a perspective view of a person posing for a prior art chroma-key image process used with embodiments of the present invention.
Figure 2:
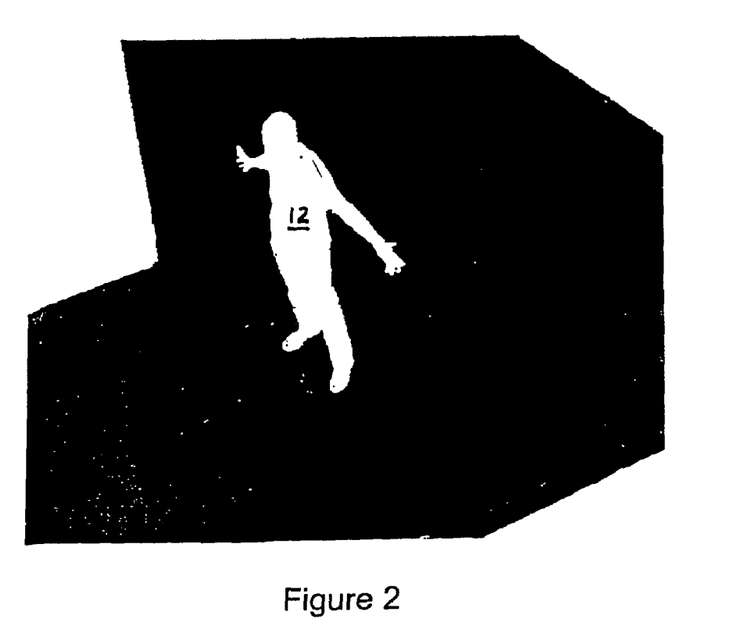
FIG. 2 is the chroma-key image resulting from the process involved in FIG. 1.

A preferred embodiment of the present invention comprises a method of providing a volumetric representation of a three-dimensional object. Referring to FIGS. 1 and 2, the object is in the form of a person 10. Of course, the object is not limited to people, but can be any object within reason. The method comprises several steps. The first step includes obtaining two dimensional (2D) binary representations, or silhouette images 12, of the object 10, using a camera and conventional chroma-keying techniques. In one embodiment, this is achieved using a multi-camera studio system with known camera parameters, as described in our GB application no. 0220972.4. For example, FIG. 2 illustrates a chroma-key representation of one view of the object 10 in front of a retro-reflective background 14 illustrated in FIG. 1. In the embodiment of the invention described below, two 2D representations of the object are obtained from the chroma-keying, representing different side views of the object. However in alternative embodiments, the method may rely on more than two images, such as ten or more. Where alternative constraints can be employed, it may be possible to use a single image.

A technique such as shape from silhouette, as described in "W. Niem, 'Robust and fast modelling of 3D natural objects from multiple views', SPIE Proceedings, Image and Video Processing II, Vol 2182, pp 88-397, San Jose, February 1994" is particularly suitable for 3D reconstruction in this application. Alternative techniques may also be used. For example, for applications such as 3D-photography with static objects, fewer cameras (or only one camera) may be used taking several pictures of the object by either fixing the camera and rotating the object on a turntable or by moving the camera around the object. For the latter, a tracking system is needed that gives the camera parameters. A suitable system for this is described in GB-A-2325807.

Figure 3:
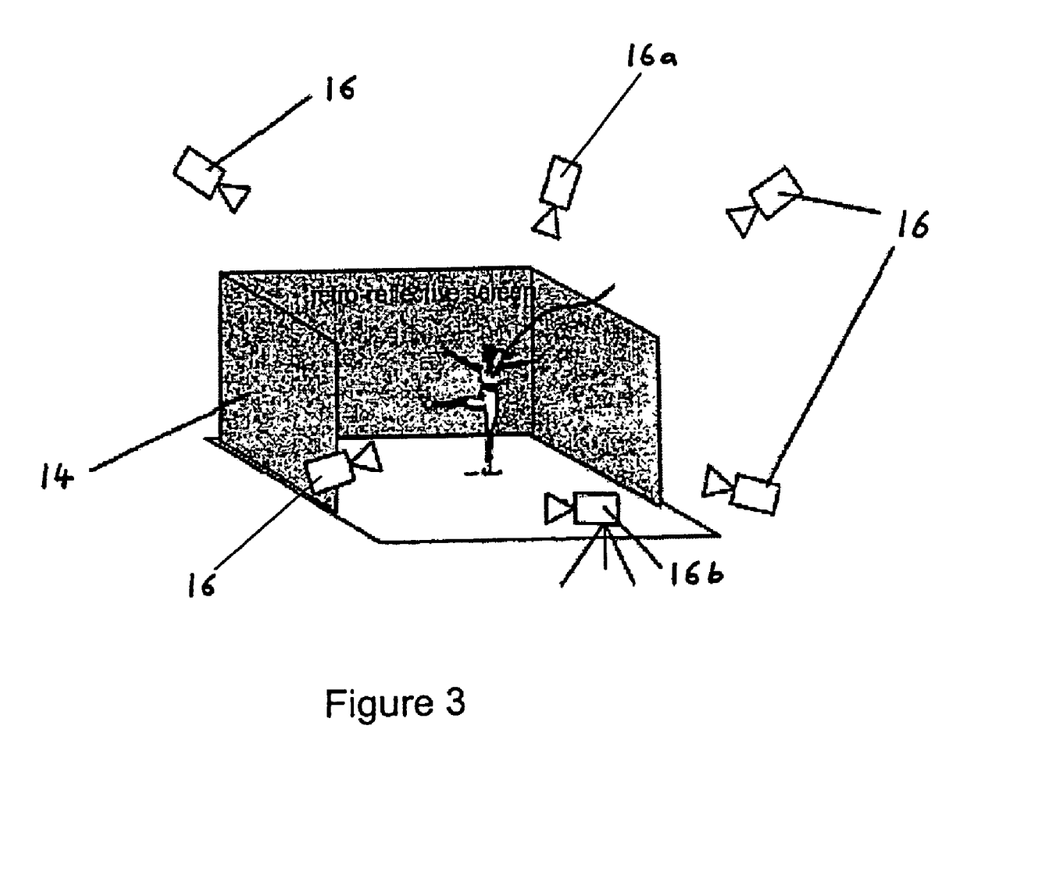
FIG. 3 is a perspective view depicting a typical studio arrangement.

Referring in particular to FIG. 3, an example of a multi-camera studio system with known parameters is illustrated. Details of such components are described in GB 2325807; GB 2321814 and UK patent application number 0206214.9, the disclosures of which are incorporated herein by reference.

The system depicted in FIG. 3 uses multiple cameras and chroma-key techniques to compute a 3D model of an actor 10. Studio cameras 16 are arranged to take images of the scene, including: at least one modified fixed camera 16a with an illuminator comprising a ring of blue LEDs for illuminating the object from the camera direction so that the retro-reflective background 14 reflects light back to the camera; and a similarly modified camera 16b with a tracking system.

One embodiment of the invention employs the marching cubes algorithm referred to above to determine a volumetric representation of the object. To use the marching cubes algorithm, an octree corresponding to the object is required. An octree is a hierarchical data structure that divides a volume, such as a voxel, into eight octants, and so on. The resolution of the determined volumetric representation is dependent on the resolution of the octree data.

Figure 4:
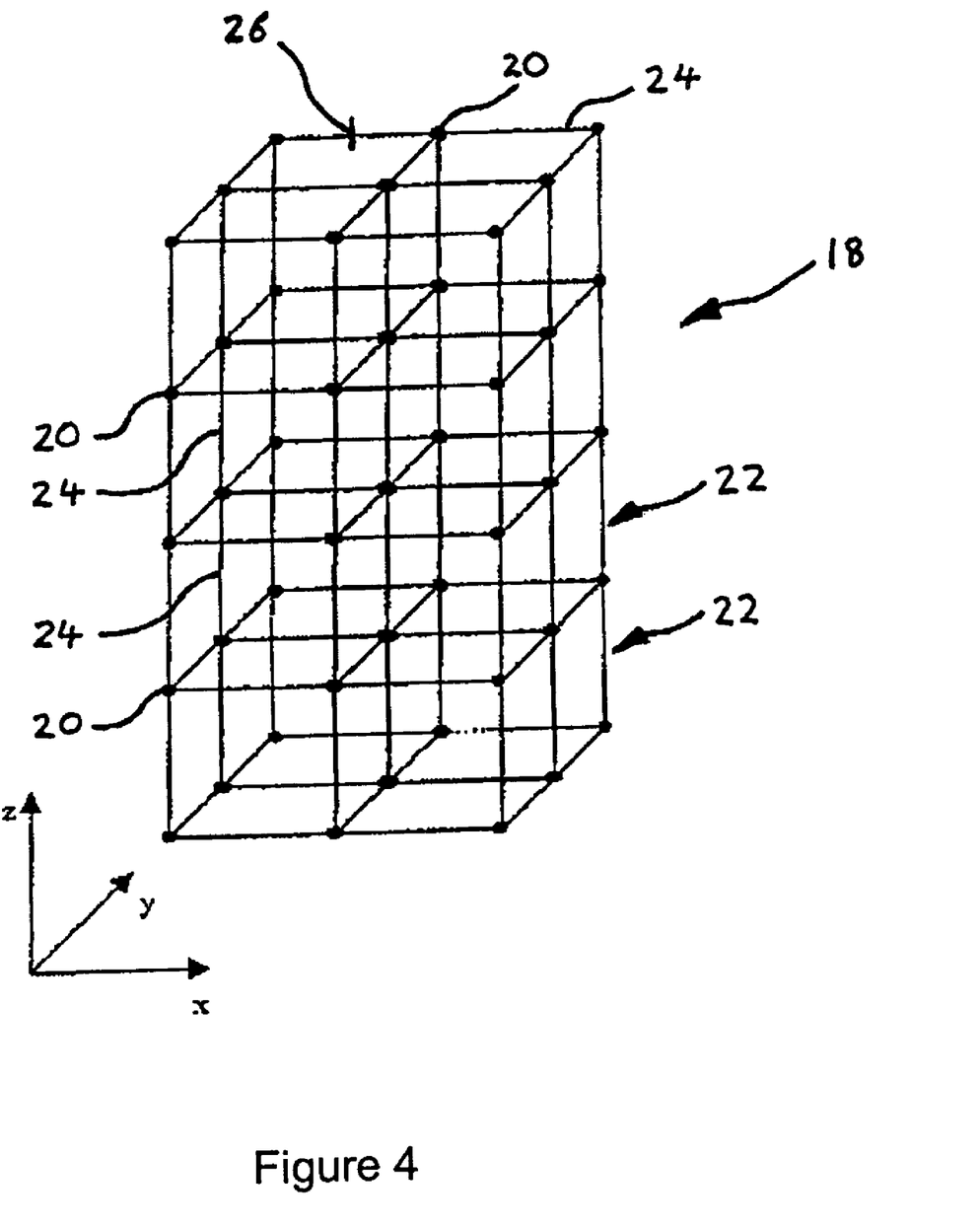
FIG. 4 is an array of voxels.

The marching cubes algorithm uses an array of voxels in a defined space that is predetermined to fit the object therein. An example of a voxel array 18 is illustrated in FIG. 4, where eight vertices 20 define each voxel 22. In turn, each adjacent pair of vertices 20 defines a voxel edge 24 therebetween. The silhouette images 12 can then be thought of as being projected into the voxels' space, or vice versa. It is then determined in which of the voxels 22 the object 10 is present, and through which of the voxels an edge of the object 10 passes. For the purpose of the specification, these latter voxels are termed "intersected voxels".

A list of the intersected voxels and their intersected edges (in terms of the voxel vertices 20 which define the respective voxel edge 24) is then compiled. This data is run through the remainder of the marching cubes algorithm, which firstly assumes the object edge passes through a midpoint 26 of the voxel edge 24, and then reads a look-up table of fifteen variations of triangles having their vertices at the voxel edge midpoints 26 between adjacent voxel vertices and assigns one or two appropriate triangles to the given intersected voxel. Although the object edge may have intersected edges at any point along the edges, the standard marching cubes algorithm assigns this voxel a triangle (not shown) with vertices at edge midpoints 26.

The following is a known iterative method for obtaining higher resolution octree data. First, a set of voxels is projected into the silhouette images. Each non-intersected voxel is ignored as relating to background space, and set to "false." Each intersected voxel is considered part of the foreground, set to "true," and subdivided into eight subvoxels, or octants. Each non-intersected octant is then set to "false," whereas each intersected octant is set to "true" and is then further subdivided and so on to a predetermined number of iterations, or maximum level $L_{max}$. $L_{max}$ will usually be predetermined to obtain a desired resulting image resolution, or at least limited by the amount of acquired data which can be appropriately processed. In this conventional octree-based reconstruction, the value of a voxel can be either "true" or "false," which gives the known quantisation error in the surface description from the marching cubes algorithm.

In one embodiment of the present invention, once $L_{max}$ has been reached, the remaining octants are further subdivided into eight equal portions to a predetermined number $L_{ss}$ of levels, and the sum of the number of "true" subdivided voxel portions are assigned to the remaining octants. This is represented by the following equation:

$$V_{O_i} = \sum_{j=1}^{L_{ss}} \sum_{k=0}^{7} V_{O_i}(j,k)$$

$V_{O_i}$ is then normalized into the range 0 to 1, for use with the marching cubes algorithm:

$$V'_{O_i} = V_{O_i}/(8^{L_{ss}})$$

This fractional portion is therefore more representative of the amount of the octant at $L_{max}$ through which the image passes, than a true or false value (1 or 0, respectively). This additional information can be used in the marching cubes algorithm to produce a more accurate surface estimate of an object.

There is a limit to the number of useful levels, that can be used in an octree, since there is no further information available if the footprint of the subdivided portion projected onto the input image is smaller than a pixel in that image. Therefore, the inventive algorithm can be implemented adaptively. In one embodiment, if the useful limit described above is reached before all $L_{ss}$ levels are divided, the algorithm does not attempt to divide that octet further. In practice, to reduce the amount of computation required, $L_{ss}$ is normally equal to 1.

A marching cubes algorithm can then used to compute the volumetric, or iso-surface, representation of the object. Since the structure is now represented by a continuous range of values (as opposed to a binary representation) a marching cubes algorithm where the surface is defined by a threshold $V_{threshold}$ can be employed. The threshold $V'_{threshold}$ is usually half the number of divided portions, i.e. $V'_{threshold}=0.5$. This modified method provides a more accurate representation of the object than by the standard marching cubes method.

Figure 5:
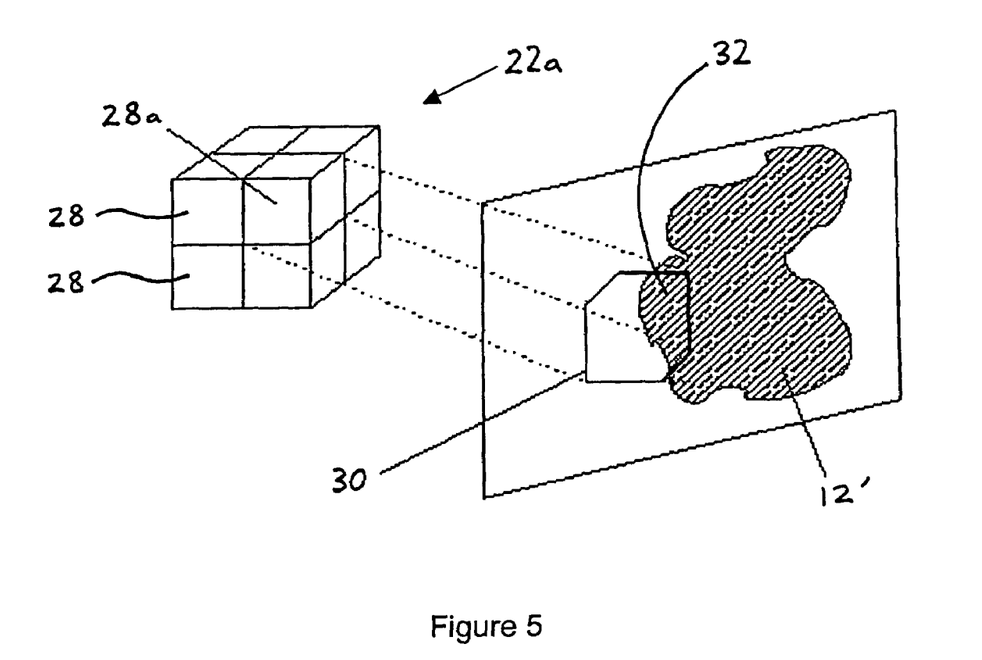
FIGS. 5 and 6 illustrate steps of preferred embodiments of the present invention, where a single voxel divided into octants, illustrating the footprint of one octant being projected into a 2D representation.
Figure 6:
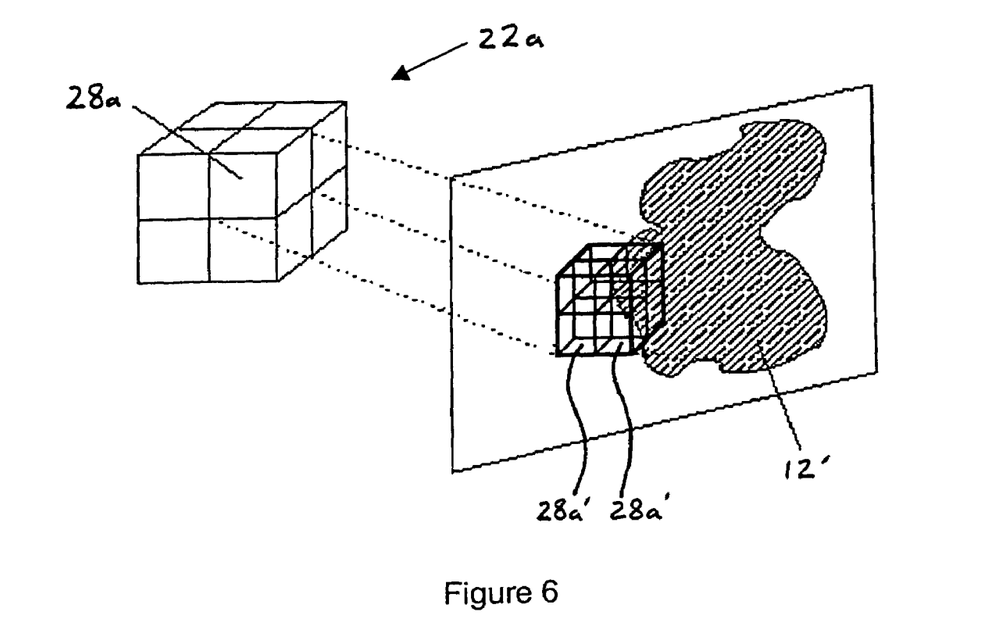

An example of the embodiment will now be described with reference to FIGS. 4 to 6. FIG. 4 illustrates an array 18 of voxels 22 in cube form. In FIG. 5, a voxel 22a is illustrated through which a surface of an image 12' passes. The voxel 22a, is therefore subdivided into octants 28, one octant 28a of which is then projected into the image 12'. The shape, or "footprint", of the octant 28a as projected into the image 12' is indicated as 30. If $L_{max}$ had not been reached by this point, since the image passes through octant 28a, the octant 28a would be further subdivided as explained above. Of course, at the same time, it would be considered with which of the octants a second silhouette image (not shown) passes. Only those octants for which all images pass are considered true.

In this example, we will assume $L_{max}$ has been reached for the voxel 22a illustrated in FIG. 5, and that $L_{ss}=1$. As is illustrated in FIG. 5, the image 12' passes through octant 28a. For the sake of example, we will assume there are only two images, and that the second image also passes through octant 28a. Octant 28a is therefore "super-sampled", or divided by an additional level, as illustrated in FIG. 6, to provide sub-octants 28a'. The number of sub-octants through which both the images pass are then summed, and a decimal fraction calculated to determine the decimal fraction of the number of true sub-octants within the octant in question. As can be seen, 6 of sub-octants 28a' are true. Therefore, assuming they are also true for the second image, $V'_{O_i}=0.75$.

The present embodiment allows for a more accurate volumetric representation of an object, without the need to increase $L_{max}$. The use of the $V_{O_i}$ value in the marching cubes algorithm instead of increasing $L_{max}$ requires relatively less processing time.

In an alternative embodiment of the present invention, the footprints of each true voxel or octant projected into the silhouette images are considered once $L_{max}$ has been reached. In the previously explained embodiment, the true octants at the $L_{max}$ level are further subdivided to $L_{ss}$ levels, and a fractional value for those true octants is calculated. In this embodiment, a fractional value for a "true" octant is calculated by counting the number of image pixels which are bounded by a footprint of that octant as a fraction of the total possible number of pixels bounded by the footprint. For example, in FIG. 5, shaded portion 32 represents the number of pixels bounded by the footprint 30 which corresponds to a voxel 28a. The decimal fraction of the number of pixels in portion 32 divided by the total possible number of pixels bounded by the footprint 30 is then calculated and assigned to that voxel. The exact footprint need not be calculated, and an approximation, such as a bounding box could instead be used to reduce computational complexity at the expense of accuracy. This data is then employed in the marching cubes algorithm as described above with reference to the previous embodiment.

Figure 7:
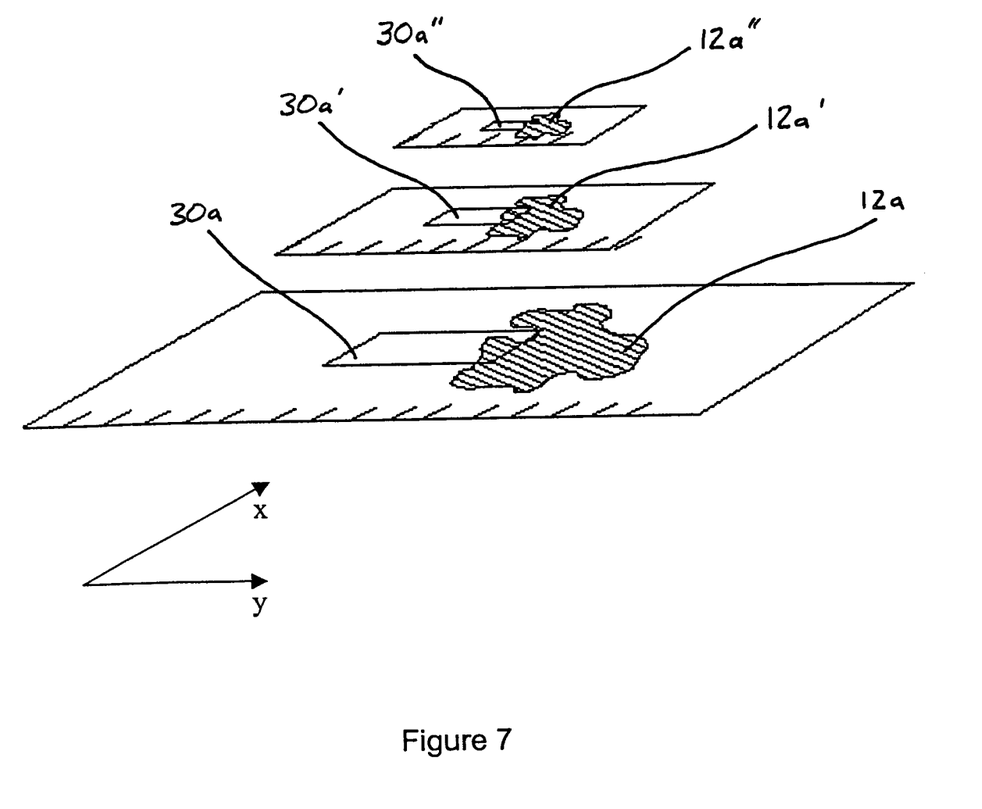
FIG. 7 is an image resolution pyramid according to an alternative embodiment of the present invention.

An embodiment of a further aspect of the invention also employs an algorithm for providing a volumetric representation of an object, the algorithm preferably being the marching cubes algorithm. In this embodiment, prior to projecting voxels into the images, or vice versa, the resolution of the image is reduced by a predetermined amount, for example by subsampling. An example of this embodiment is illustrated in FIG. 7. For this example, the reduction factor is 16 and is achieved in two stages. This is achieved by first subsampling the image 12a by a factor of two in both x and y directions. Therefore, each pixel in the reduced image 12a' contains a sum of the pixels from the associated 2×2 region of the original image 12a. The reduced image 12a' is then further sub-sampled by a factor of two in both x and y directions. Each pixel in the further reduced image 12a" contains the sum of the pixels from the associated 2×2 region of the reduced image 12a'. Techniques for performing such subsampling are well known, and any appropriate technique can be employed.

Information describing all three images 12a, 12a' and 12a" and their relationship to one another is held in a look up table of a "pyramid" of the images. Voxels and octants can then be projected into the image of a selected resolution in order to test for "true" octants. When assessing a footprint to determine the presence of image pixels, is desirable to use an image at a lower resolution since this requires less pixels to be accessed. Suitably, for an octant of a certain size, or at a certain level an image having a corresponding level is selected, i.e. "coarser" voxels can be projected onto lower resolution images without a substantial reduction in accuracy. Higher resolution images can be accessed as an algorithm passes through succeeding octet levels. As will be apparent to the skilled addressee, time taken to gather true pixel data can be decreased using this method.

In alternative arrangements of this embodiment, the pyramid may include additional levels of even further reduced images, or levels where the images are reduced by different amounts, such as 0.5 or 3, for example. Furthermore, if the desired resolution of reconstructed volumetric representation is less than would be obtained using pixels from the original image, the algorithm may be adjusted to access reduced image data from within the pyramid.

An embodiment of a further aspect of the invention considers the problem of redundant voxels, which can occur due to approximation errors in the reconstructed 3D volumetric representation. Such errors are typically greatest when a small number of cameras are used. For example, the hatched areas 34 illustrated in FIG. 8 indicate the approximation error of a reconstructed object from only two cameras 36 and 38. A theoretically accurate reconstruction of the object is indicated at 40. However, combined with the hatched areas 34, the marching cubes algorithm returns an approximation bounded by lines 42 to 45. These lines represent surfaces on the 3D model and will be referred to a cut lines or cut surfaces as appropriate.

Figure 8:
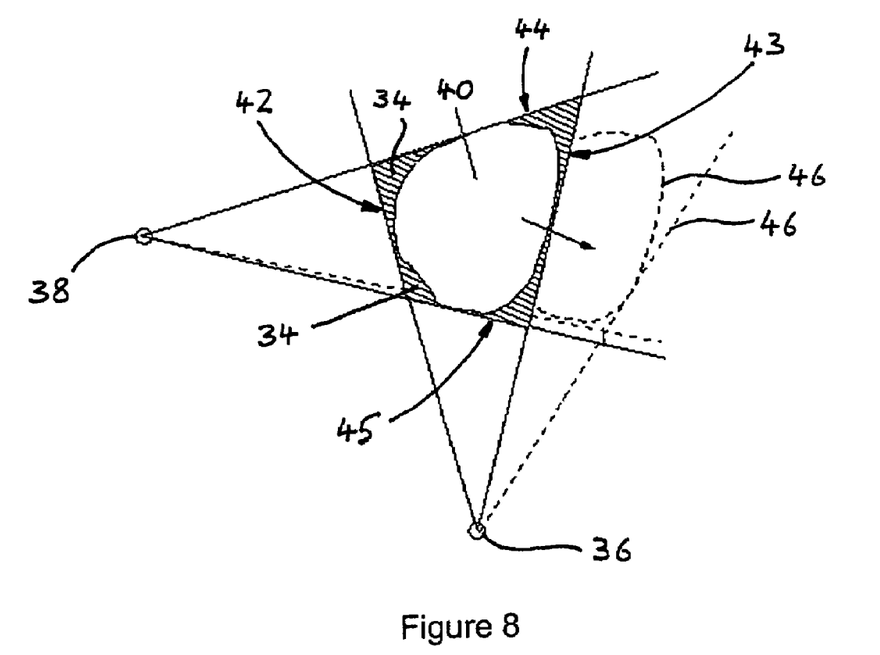
FIGS. 8 and 9 illustrate an approximation procedure according to another alternative embodiment of the present invention.

As mentioned above in relation to the prior art, this error is exacerbated when reconstructing volumetric representations of moving objects, such as indicated by dotted lines 46 in FIG. 8. Although it is not possible to reconstruct the exact shape of the object from shape-from-silhouette techniques, this embodiment employs an algorithm based on the model that it is possible to remove voxels in the hatched areas 34 on a heuristic basis.

Figure 9:
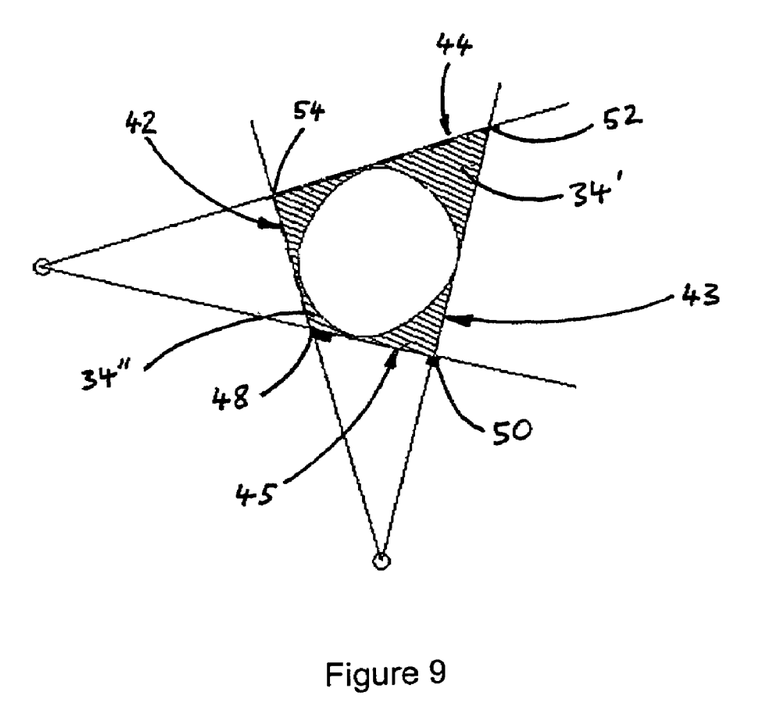

In this aspect of the invention, voxels which are considered to be redundant are removed from a reconstructed object, based on a number of parameters relating to cut lines or cut surfaces. Referring to FIG. 9, voxels are suitably removed preferentially at cut line intersections 48, 50, 52 and 54, and adjacent to cut lines.

A first parameter is the length of the cut line. The longer the cut line, the greater the volume which is removed (or the number of voxels which are removed). A second, related, parameter is the distance of a voxel from an intersection of cut line or cut surfaces. Regions which are closer to intersections are preferentially removed. A third parameter is the angle of intersection of two cut surfaces. A greater volume is removed at intersections which have more acute angles.

Therefore, the number of removed voxels at or adjacent points of intersection will tend to increase proportionally with the increasing length of the edge. The number of removed voxels at or adjacent points of intersection will tend to increase proportionally with the decreasing angle between adjacent edges, and, in the region adjacent the intersection point, more voxels will tend to be removed closer to the edge than are removed away from the edge. These considerations reflect the assumption in this model that most natural objects have rounded, rather than square, edges.

Embodiments of the invention will use combinations of functions of such parameters to define algorithms for removing voxels. In addition to the voxel data, further data concerning the cut surfaces is desirably stored. This information may include which cameras are associated with particular cut surfaces.

In the example illustrated in FIG. 9, 56 indicates the approximate reconstruction of the object. As is illustrated, the angle of intersection 52 is smaller than the angle of intersection 48, and edges 43 and 44 are longer than bounding portions of edges 42 and 45. Therefore, more voxels were set to false at or adjacent intersection 52 when compared with intersection 48, indicated by shaded (removed) area 34' being greater than shaded (removed) area 34". The resulting reconstruction 56 of the object is therefore more accurate than the reconstruction obtained by known methods, and bound by lines 42 to 45.

Figure 10:
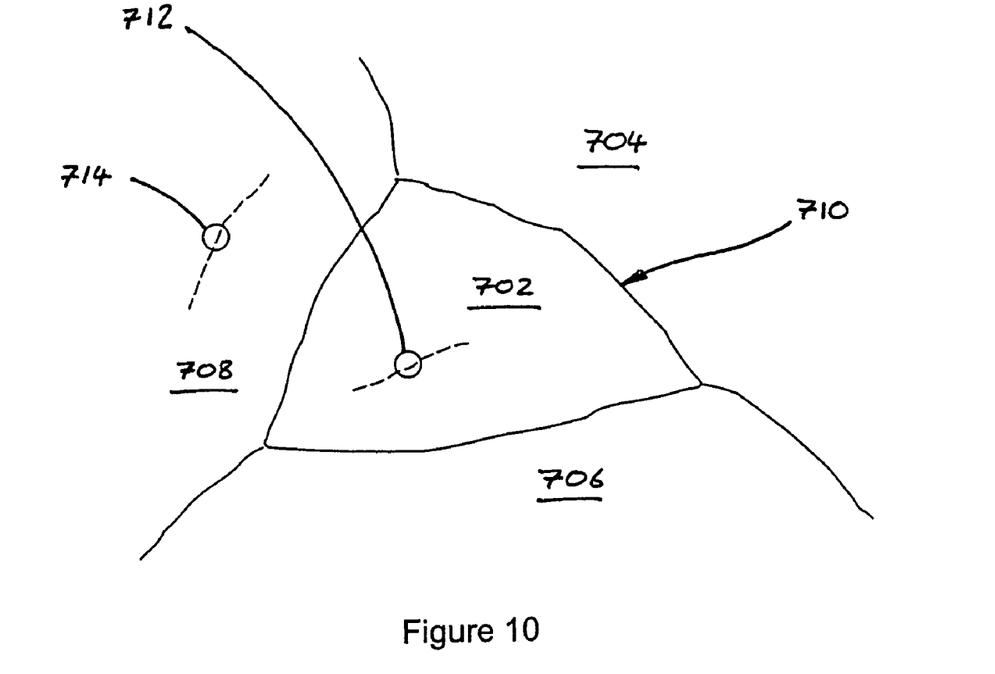
FIGS. 10 and 11 illustrate a method of fitting a spline to a 3D volumetric representation.
Figure 11:
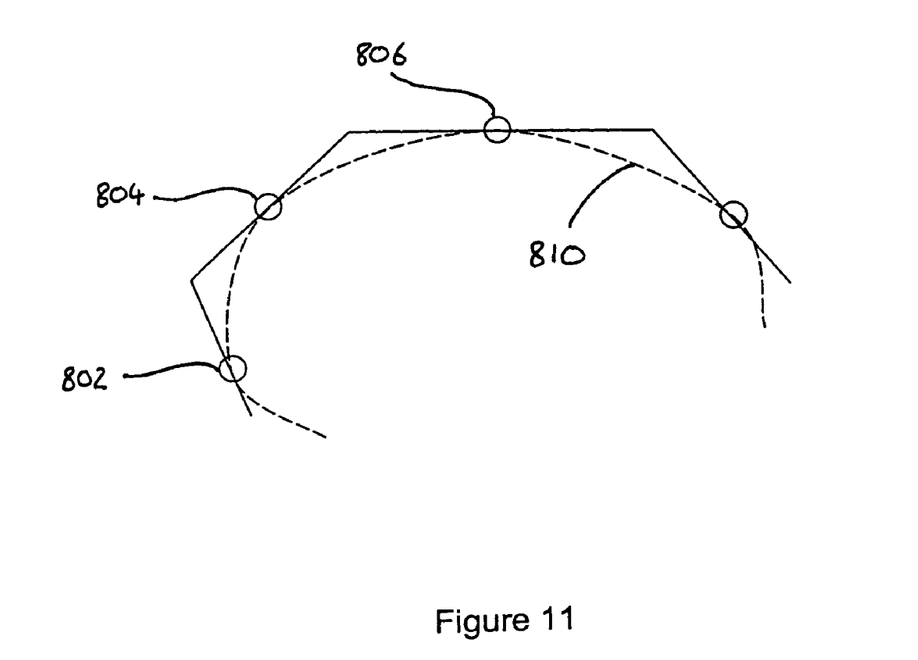

A further example is illustrated in FIGS. 10 and 11. Referring to FIG. 10, part of a surface of a reconstructed object is shown comprising of cut surfaces 702, 704, 706 and 708. These cut surfaces will be at angles to one another, and define surface edges, or intersections, e.g. edge 710. The distance of each element on a cut surface to the closest edge with another cut surface is calculated. Thus a distance function is created across the surface, and this distance function will typically exhibit local maxima or turning points, such as at 712 and 714. Referring now to FIG. 11, there is shown a 2D view of a 'chain' of cut surfaces. Local maxima or discontinuities of the distance function described above are indicated at points 802, 804 and 806. A spline function 810 is fitted to these points, and voxels outside the spline function are removed.

Furthermore, texture maps can be applied to the outcome of the above described embodiments of the present invention to render a more realistic representation of an object.

Another aspect of the invention concerns the use of temporal information to improve shape reconstruction. It has been recognized that in many applications there are properties of the 3D object which do not vary substantially with time. In particular the volume of most objects remains approximately constant. Embodiments of this aspect of the invention make use of these properties by producing a reconstruction over a period of time, which reconstruction can be constrained or optimized to be temporally consistent, rather than independently computing a reconstruction at each time instant. In this way we consider the object surface over time, i.e. in 4D space. A surface in 4D is a hyper-surface.

The reconstruction problem can be formulated as an optimisation of the hyper-surface. In "M. Magnor and B. Goldluecke, Spacetime-coherent Geometry Reconstruction from Multiple Video Streams, in Proc. 3D Data Processing, Visualization, and Transmission (3DPVT'04), Thessaloniki, Greece" an approach is described that computes a photo consistent hyper-surface using a level-set evolution.

Embodiments of the present invention apply a smoothing operator to that hyper-surface, which can be implemented more efficiently than a level-set evolution. The smoothing is able to remove artefacts and to some extend redundant voxels. The smoothing operator can take into account the fact that the object does not vary significantly in volume.

It is desirable to use a 16-tree to store the data. A 16-tree is defined in 4D and is the generalization of an octree, which is defined in 3D. The amount of memory required for this representation is proportional to the object's surface and motion.

Many of the above described embodiments employ the marching cubes algorithm. As will be appreciated by persons skilled in the art, other algorithms, or procedures may be used to obtain the approximate volumetric representation of the object in alternative embodiments. For example, a marching triangles procedure may by used ("Marching Triangles: Range Image Fusion for Complex Object Modeling" Hilton, 1., Stoddart, A. J., Ilingworth, J. and Windeatt, T. IEEE 1996 International Conference on Image Processing'.)

While the present invention has been described in its preferred embodiments, it is to be understood that the words which have been used are words of description rather than limitation and that changes may be made to the invention without departing from its scope as defined by the appended claims.

Each feature disclosed in this specification (which term includes the claims) and/or shown in the drawings may be incorporated in the invention independently of other disclosed and/or illustrated features.

The invention thus provides a method of providing a volumetric representation of a three-dimensional object. First, at least two two-dimensional (2D) representations of the object are obtained, preferably by a chroma key process. A set of voxels is then projected into the 2D representations and it is determined with which of the voxels or portions thereof the 2D representations intersect. For each voxel or portions thereof with which the 2D representations intersect, data is determined which represent a proportion, or fraction, of each voxel or portion thereof which intersects with each 2D representation. This data is applied to a marching cubes algorithm to provide the volumetric representation. Several examples are given for how to determine the proportion, or fraction, of each voxel or portion thereof which intersects with each 2D representation. The examples are based on either volumetric fractions, or pixel fractions.

The invention claimed is:

1. A method of providing a volumetric representation of a three dimensional object, comprising:
   defining a plurality of voxels in a three dimensional space,
   categorizing voxels as foreground or background according to at least one silhouette image of the object, foreground voxels being assigned a first binary value, and background voxels being assigned a second binary value,
   assigning to at least some voxels a value intermediate to the first and second binary values; and
   at least in part on the basis of the assigned value, outputting data representative of the three-dimensional object.

2. The method of claim 1, wherein the intermediate value is based on an estimate the ratio of foreground to background contained within the voxel.

3. The method of claim 2, wherein the estimate is derived by dividing the voxel into volume fractions, assigning volume fractions as background or foreground, and forming a fractional sum.

4. The method of claim 2, wherein the estimate is derived by projecting the voxel onto the silhouette image, assigning areas of the projection as foreground or background, and taking an area ratio.

5. The method of claim 1, wherein voxels are defined by a recursive division algorithm.

6. The method of claim 5, wherein the dividing into volume fractions comprises performing one or more additional stages of the recursive division algorithm.

7. The method of claim 1, wherein the intermediate values are used by a marching cubes algorithm to produce a 3D surface.

8. A method of providing a volumetric representation of a three dimensional object, in which a three dimensional space is comprised of a plurality of voxels, and wherein voxels are categorized as foreground or background according to at least one silhouette image of the object, the method comprising:
   subsampling the at least one silhouette image,
   comparing a projection of at least one voxel with the sub-sampled image to categorize the voxel; and
   outputting data representative of the comparison.

9. The method of claim 8, further comprising, for at least one silhouette image, storing a plurality of equivalent images at different resolutions.

10. The method of claim 9, wherein for each projection, an image from the plurality of equivalent images is selected for comparison.

11. The method of claim 10, wherein one of the plurality of equivalent images is selected according to the size of the voxel.

12. The method of claim 8, wherein subsampling maintains the aspect ratio of the at least one silhouette image.

13. The method of claim 8, wherein subsampling is by a factor of 2.

14. A method of providing a volumetric representation of a three dimensional object as the intersection of generalized cones of at least one silhouette image of that object, the method comprising
   deriving one or more geometry parameters in dependence on the geometry of the intersections of the generalized cones,
   selectively removing volume from the representation in dependence on the geometry parameters; and
   outputting data representative of the representation from which the volume has been selectively removed.

15. The method of claim 14, wherein the one or more geometry parameters includes the length of the intersection.

16. The method of claim 14, wherein the one or more geometry parameters includes the distance of that volume from the intersection.

17. The method of claim 14, wherein the one or more geometry parameters includes the angle of intersection.

18. The method of claim 14, further comprising selecting a set of surface points on the representation in dependence on distance to the nearest intersection, fitting a spline function to the set of points, and removing volume based on the spline function.

19. A method of providing a volumetric representation of a three dimensional object, in which a three dimensional space is comprised of a plurality of voxels, and wherein voxels are categorized as foreground or background according to at least one silhouette image of the object, the method comprising:
   representing the object over a period of time as a 4D model defining a hyper-surface,
   applying a smoothing operator to the 4D hyper-surface; and
   outputting data representative of the three dimensional object at least in part on the basis of the smoothed 4D hyper surface.

20. The method of claim 19, wherein the 4D model reduces the variation with time of a 3D parameter of the object.

21. The method of claim 19, wherein the 4D model reduces the variation with time of the volume of the object.

22. A manufacture comprising a computer software product for providing a volumetric representation of a three-dimensional object the product comprising a computer readable medium in which program instructions are stored, the instructions, when read by a computer, causing the computer to
   define a plurality of voxels in a three dimensional space,
   categorize voxels as foreground or background according to at least one silhouette image of the object, foreground voxels being assigned a first binary value, and background voxels being assigned a second binary value, and
   assign to at least some voxels a value intermediate the first and second binary values.

* * * * *